July 19, 1927.
F. G. TERRY
1,636,578
THRASHING MACHINE
Filed Oct. 1, 1925
2 Sheets-Sheet 1
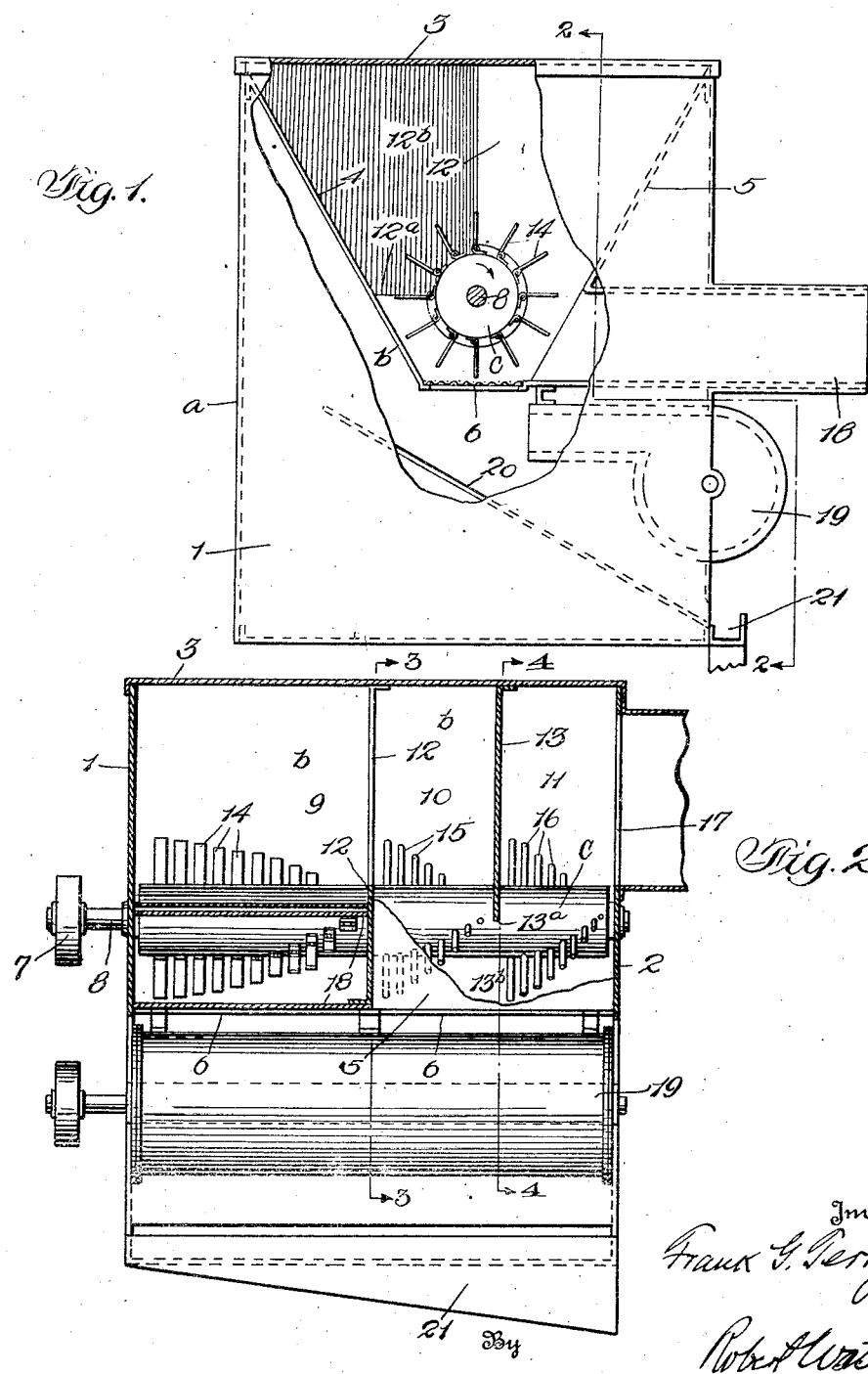

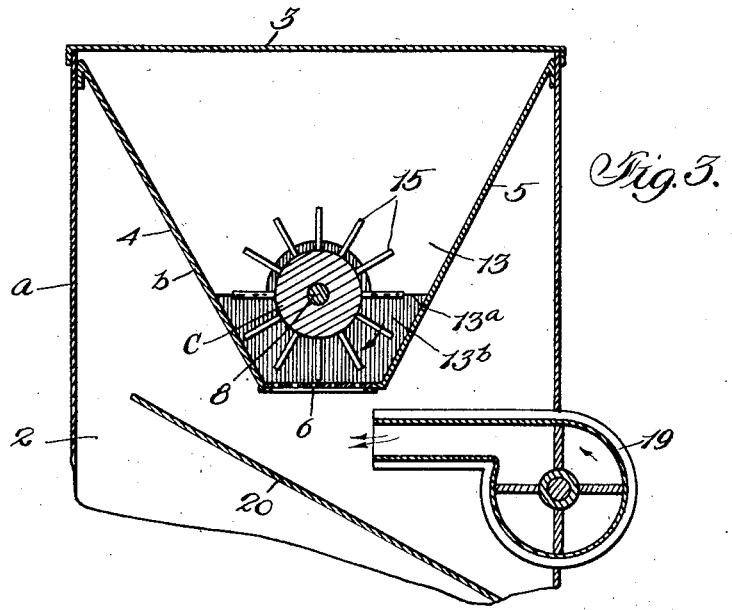
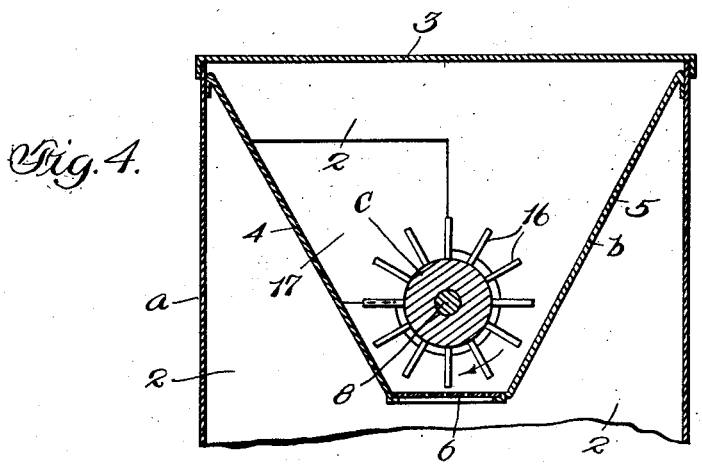

Patented July 19, 1927.

1,636,578

UNITED STATES PATENT OFFICE.

FRANK G. TERRY, OF SALINAS, CALIFORNIA.

THRASHING MACHINE.

Application filed October 1, 1925. Serial No. 59,966.

This invention relates to improvements in thrashing machines whereby, with relatively few parts, the machine will give a substantially perfect separation of the grain and straw.

In carrying out the invention, I provide a casing having a feed chute at one end, an outlet for the straw at the opposite end, and a revoluble shaft or drum, extending through the lower part of the casing, has spirally arranged beaters which move the straw from the inlet to the outlet ends of the machine. Partitions are arranged transversely within the casing, dividing it into several compartments, and the several partitions have openings which are out of registry with one another so that the straw, in being carried along by the beaters, must travel in a tortuous course through the machine. The sides of the machine diverge upwardly, affording a relatively large space above the drum into which the straw and grain are tossed numerous times by the beaters in passing through the machine, and in this space the loosened grain readily separates from the straw and is directed by the inclined sides of the casing to the bottom thereof. A screen constitutes the bottom of the casing and after the grain and chaff have passed through this screen, a blast of air separates the chaff from the grain in the usual manner.

In the accompanying drawing,

Fig. 1 is an end elevation of the thrashing machine, the end wall of the housing being broken away;

Fig. 2 is a section on the line 2—2 of Fig. 1;

Fig. 3 is a section on the line 3—3 of Fig. 2; and

Fig. 4 is a section on the line 4—4 of Fig. 2.

Referring to the drawing, $a$ represents the housing of a thrashing machine which is of general rectangular form and contains a casing $b$ in its upper portion, in which the grain is thrashed. This casing is formed from the end walls 1 and 2 of the housing, a top 3, and two side walls 4 and 5 which converge downwardly from the side edges of the top to a screened bottom 6. A shaft or drum $c$ extends longitudinally through the lower part of the casing $b$ and is journaled in the end walls and is adapted to be rotated by power applied to a pulley 7 on a shaft 8 which extends through the drum. The casing $b$ is relatively narrow in its lower part, and the drum extends through this narrow portion so that a large free space is left above the drum, into which the straw may be tossed, as hereinafter explained. The casing is divided into several compartments 9, 10, and 11, by transverse partitions 12 and 13. That part of the drum which is within the compartment 9 is provided with hinged flails or beaters 14, arranged spirally on the drum; and the part 10 is also provided with beaters 15, arranged spirally, and these are preferably in the form of pins projecting from the drum. Other spirally arranged beaters 16 are mounted on the drum within the compartment 11. The beaters which are in the several compartments may be all alike, if desired, and they are hinged or rigidly secured to the drum, as desired. The partition 12 extends about half across the casing above the drum, as shown in Figs. 1 and 2, and also around the lower side of the drum to a point indicated by the line $12^a$, and above this line is an opening $12^b$ which establishes communication between the compartments 9 and 10. The partition 13, as shown in Fig. 3, extends across all of the upper part of the casing and down to the horizontal line $13^a$, leaving an opening $13^b$ below the axis of the drum, which establishes communication between the compartments 10 and 11. The end wall 2 of the housing has an outlet opening 17, as shown in Figs. 2 and 4, through which the straw may pass from the compartment 11.

A horizontal feed chute 18 communicates with the compartment 9 of the casing through an opening in the sloping side wall 5 and directly opposite the drum $c$.

A blower 19 is arranged beneath the feed chute and is adapted to send a blast of air horizontally beneath the screen 6, to blow the chaff out of the grain which falls through said screen and on to an inclined floor 20, which leads to a delivery chute 21.

In operation, the unthrashed grain is fed into the machine through the feed chute 18 and is caught by the flails 14 and carried under the drum $c$, and tossed upwardly in the relatively large space above the drum in the compartment 9. In this space, the loosened seeds or grain separate freely from the straw and are directed by the sloping sides 4 and 5 to the screened bottom 6, through which the grain passes and is cleaned by the air blast in falling on to the inclined plane 20. Owing to the spiral arrangement of the flails, the straw is constantly worked toward the partition 12 and through the opening 12$^b$ into the compartment 10. This partition, it will be noted, extends partly around and below the drum, so that the straw cannot pass directly from the compartment 9 to the compartment 10, below the drum, and must pass through the opening 12$^b$. In the compartment 10, the beaters 15, acting like forks, again toss any unthrashed grain into the enlarged space above the drum in the compartment 10, and a further separation takes place, the grain or seeds being directed by the inclined sides 4 and 5 to the screened bottom. The straw which is then generally free from grain, is carried along by the spirally arranged beaters 15 and forced through the opening 13$^b$ into the compartment 11, below the drum. Here it is caught by the beaters 16 and tossed upwardly in the compartment 11, and finally the straw is ejected by the beaters 16 through the outlet opening 17. Any grain separating from the straw in the compartment 11 will be directed by the inclined sides 4 and 5 to the screen bottom and this, with the grain from the compartment 10, will be cleaned by the air blast as it passes from the screen.

It is to be noted that the partitions 12 and 13 constitute baffle plates having openings which are out of register with one another so that the straw must follow a tortuous course through the casing, and it therefore must be taken up by the beaters and tossed into the upper part of the casing numerous times before the straw passes from the casing through the outlet 17.

The beaters in the first compartment 9 are preferably in the form of flails hinged to the drum. These may also be used in the other compartments, but I prefer to use rigid pins in the latter compartments, as the thrashing is principally accomplished in the first compartment and the principal function of rigid beaters in the subsequent compartments is to toss the straw and allow any loosened grain in the straw to separate. While I have shown two partitions or baffles, the number of these may be increased, or varied, as desired.

What I claim is:

1. In a thrashing machine, a casing having a top, bottom and upwardly diverging side-walls, and having an inlet at one end and an outlet at the opposite end, a rotatable drum extending longitudinally in the lower part of the casing and having spirally arranged beaters adapted to carry straw from the inlet to the outlet, the diverging side walls extending considerably above the drum to provide a relatively large space into which the straw may be tossed by the beaters and in which the grain may separate from the straw, and a transverse partition in the casing extending below the drum and having an opening above the drum.

2. In a thrashing machine, a casing having a top, bottom and upwardly diverging side-walls, and having an inlet at one end and an outlet at the opposite end, a rotatable drum extending longitudinally in the lower part of the casing and having spirally arranged beaters adapted to carry straw from the inlet to the outlet, the diverging side-walls extending considerably above the drum to provide a relatively large space into which the straw may be tossed by the beaters and in which the grain may separate from the straw, and two spaced transverse partitions in the casing, the one nearer the inlet extending below the drum and having an opening above the drum, and the other extending above the drum and having an opening below the drum, and the outlet opening of the casing being above the drum.

In testimony whereof I hereunto affix my signature.

FRANK G. TERRY.